(No Model.)

T. ALDCORN.
BALL AND SOCKET PIPE COUPLING.

No. 412,940. Patented Oct. 15, 1889.

WITNESSES:
D. C. Reusch.
C. Sedgwick.

INVENTOR:
T. Aldcorn
BY Munn & Co.
ATTORNEYS.

UNITED STATES PATENT OFFICE.

THOMAS ALDCORN, OF NEW DURHAM, NEW JERSEY.

BALL-AND-SOCKET PIPE-COUPLING.

SPECIFICATION forming part of Letters Patent No. 412,940, dated October 15, 1889.

Application filed June 15, 1889. Serial No. 314,329. (No model.)

*To all whom it may concern:*

Be it known that I, THOMAS ALDCORN, of New Durham, in the county of Hudson and State of New Jersey, have invented a new and Improved Ball-and-Socket Pipe-Coupling Joint, of which the following is a full, clear, and exact description.

This invention relates to that class of coupling-joints having special reference to the connection between railway-cars, the steam or air pipes extending beneath the cars, in which the joint is formed with a ball and socket and a spring, the ball and socket providing a joint adapted for the turning of cars in rounding curves, and the spring permitting of endwise movement as the adjacent ends of the cars move toward and from each other.

The invention consists in the novel construction and combination of parts, as hereinafter described and claimed.

Reference is to be had to the accompanying drawings, forming a part of this specification, in which similar figures of reference indicate corresponding parts in both the views.

Figure 1:
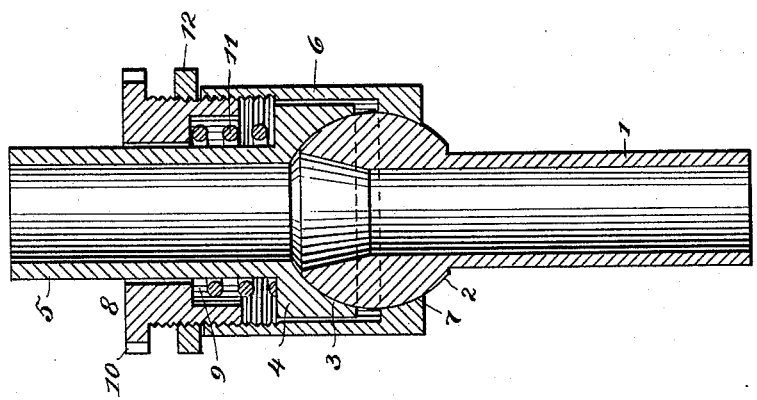
Figure 2:
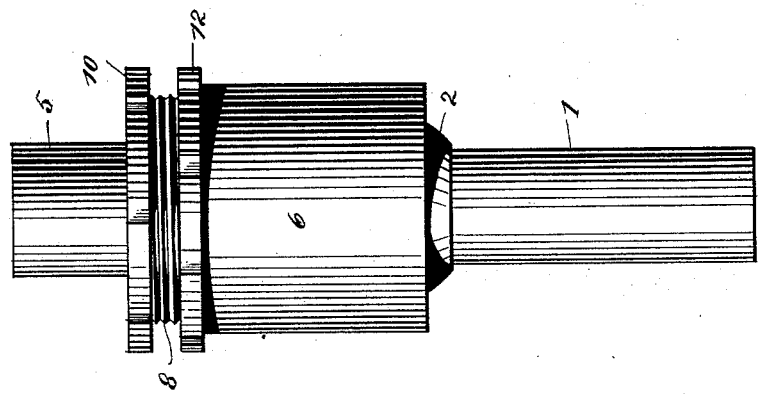

Figure 1 is a view in longitudinal section of the joint constructed in accordance with this invention, and Fig. 2 is an external view.

1 indicates a pipe, having a ball 2 at its end fitting the socket 3 in the head 4 at the end of the pipe 5. Inclosing the joint formed by the ball 2 and socket 3 is a cylindrical sleeve or casing 6, having an opening at its forward end with a beveled edge 7, in which the ball 2 is adapted to rest and turn and is held from being pulled out of the casing 6. The rear end of the casing 6 is provided with a cylindrical head 8, which screws into the casing 6, and is formed at its inner end with the chamber or recess 9, and at its outer end with a notched flange 10, for screwing and unscrewing the head 8. The pipe 5 extends through the cylindrical head 8, and the head 4 of pipe 5 is of a diameter to fit and move freely within the casing 6, the latter being of such a length that when the head 8 is screwed into place there will be room enough for the head 4 to move endwise between the outer end of casing 6 and the inner end of head 8. In order to hold the ball 2 and socket 3 together, a coiled spring 11 is placed over the pipe 5, and is located between the head 4 and the top of chamber 9 in head 8. By means of the construction as hereinbefore described the ball 2 is free to roll or turn in the socket 3 and the beveled edge 7 of the opening in casing 6, and when end-thrust occurs from the adjacent ends of two cars moving toward each other the ball 2 and socket 3 will move together within the casing 6, in one direction against the spring 11, and in the other direction by the reaction of spring 11, thereby always maintaining a steam-tight joint. The tension of the spring 11 may be regulated to hold the ball 2 and socket 3 more or less tightly together by adjusting the head 8 in the casing 6, the head 8 being held in its adjusted position in the casing 6 by a ring or collar 12, screwing on the head 8, between its flange 10 and the inner end of casing 6. The several parts of the joint may be made of any suitable metal, the parts being arranged as described. No packing is necessary.

With a pipe-coupling joint constructed in accordance with this invention the ball-and-socket joint will not become separated by the end-thrust of the cars and permit steam or air to escape, and the joint may be readily and quickly coupled and uncoupled.

Having thus described my invention, what I claim as new, and desire to secure by Letters Patent, is—

1. A pipe-coupling joint consisting of a casing with a bevel-edged opening at one end and a cylindrical screw-head at the other end, a pipe having a ball at its end resting within the bevel-edged opening, a pipe extending through the cylindrical head and having a socket fitting against the ball within the casing, and a coiled spring mounted on the pipe extending through the cylindrical head and located between the cylindrical head and the head of the pipe, substantially as shown and described.

2. A pipe-coupling joint consisting of a casing with a bevel-edged opening at its outer end, an externally-screw-threaded cylindrical head screwing into the casing at its inner end, a collar screwed on the cylindrical head, a ball-and-socket pipe-joint located in the casing with the ball resting within the beveledged opening, and a coiled spring mounted on the pipe, having the socket end between its head and the cylindrical head, substantially as shown and described.

3. A pipe-coupling joint consisting of the casing 6, with an opening at its outer end having a beveled edge 7, a pipe 1, having a ball 2 at its end resting within the beveled edge 7, a cylindrical externally-threaded head 8, screwing into the inner end of casing 6 and formed with a chamber 9 at its inner end and a notched flange 10 at its outer end, a pipe 5, extending through the cylindrical head 8 and having a head 4, with a socket 3, fitting against the ball 2, a coiled spring 11, mounted on pipe 5, between its head 4 and the top of chamber 9, and a ring 12, screwed on the cylindrical head 8, substantially as shown and described.

THOMAS ALDCORN.

Witnesses:
E. W. CADY,
C. SEDGWICK.